United States Patent
Dietrich

[15] 3,704,916
[45] Dec. 5, 1972

[54] FLANGELESS HUB FOR TRACTOR
[72] Inventor: William J. Dietrich, Congerville, Ill.
[73] Assignee: Dietrich Manufacturing Company, Goodfield, Ill.
[22] Filed: Oct. 2, 1970
[21] Appl. No.: 77,424

[52] U.S. Cl. ................301/1, 287/52.04, 301/105
[51] Int. Cl. ............................................B60b 27/06
[58] Field of Search..287/52.04, 52.05, 52.07, 52.06, 287/53 R; 301/1, 128, 53 R, 105, 9 TV

[56] References Cited
UNITED STATES PATENTS
2,819,117  1/1958  Glazier ......................301/128
3,476,416  11/1969  Gilmour ......................301/1
3,454,305  7/1969  Gilmour ......................301/1
3,560,031  2/1971  Gilmour ................287/52.06

Primary Examiner—Richard J. Johnson
Attorney—Dawson, Tilton, Fallon and Langmus

[57] ABSTRACT

An improved structure for attaching an additional wheel to the axle of a tractor is disclosed wherein two side strengthening ribs are provided extending between an annular connecting collar to which the additional wheel is mounted and a mounting block having a bearing surface for receiving the axle and mounting the hub to it. The ribs add strength and bulk to the hub and prevent fracture.

2 Claims, 6 Drawing Figures

PATENTED DEC 5 1972 3,704,916
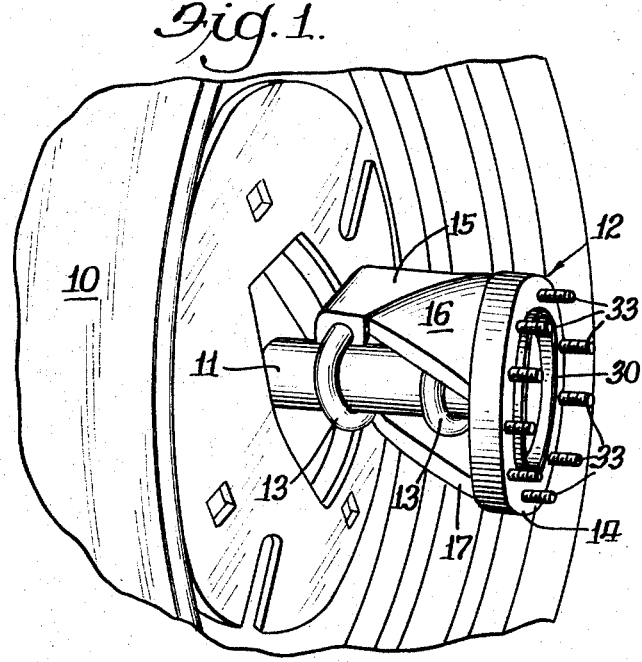
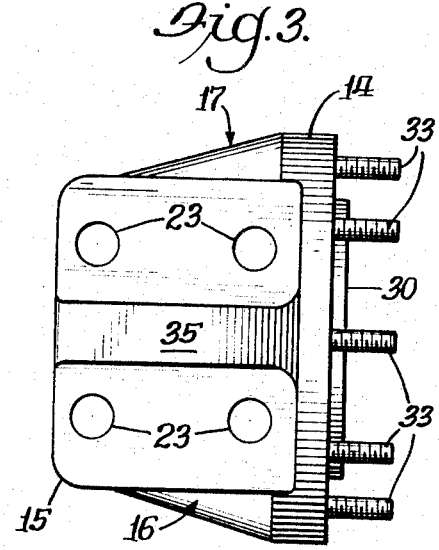
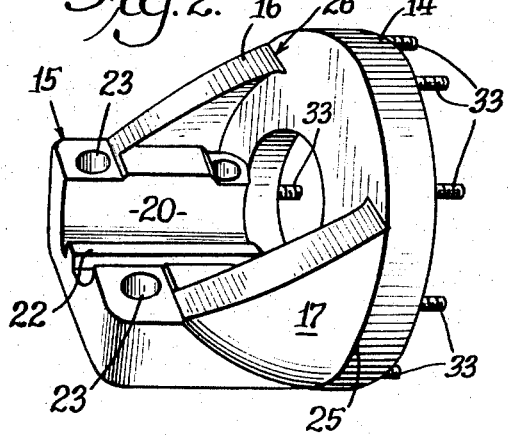
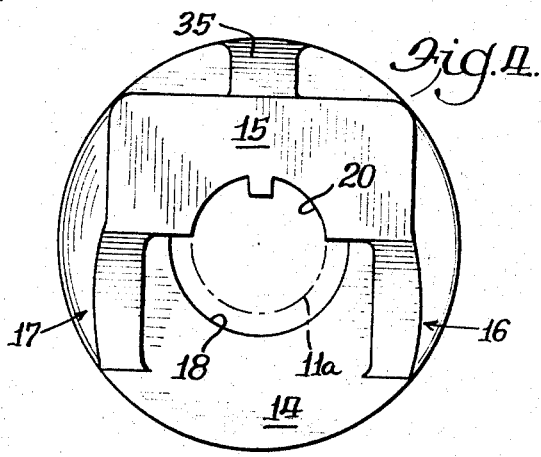
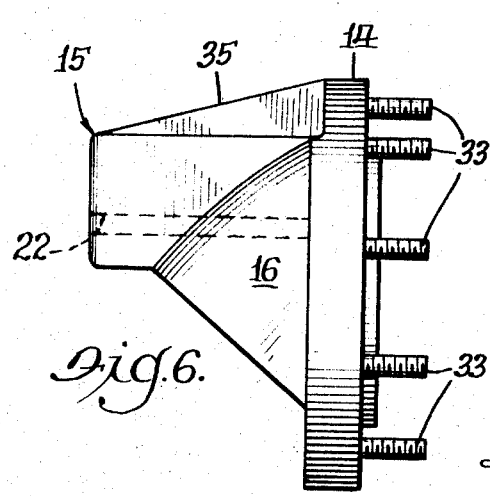
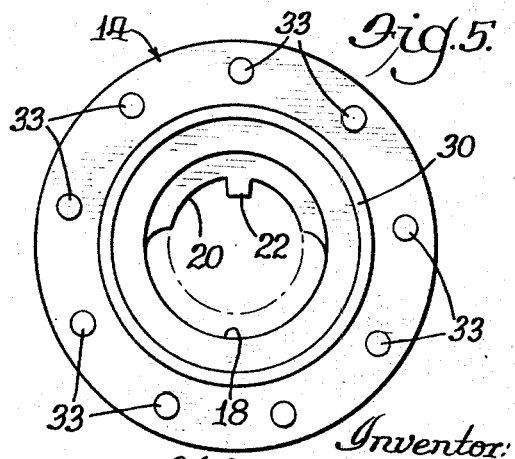
Inventor:
William J. Dietrich
By: Dawson, Tilton, Fallon & Lungmus
Attys.

FLANGELESS HUB FOR TRACTOR

BACKGROUND OF THE INVENTION

1. Field of the Invention

The present invention relates to attachments for tractive vehicles such as agricultural tractors and the like; and more particularly, it relates to an improved system, including a novel hub structure for connecting an additional wheel to the axle of a tractor. Additional wheels are sometimes added to the existing drive wheels of a tractor to gain additional traction; and toward this end, the axles of agricultural tractors usually extend beyond the original equipment drive wheels for receiving a movable hub to which the additional wheel is secured.

2. Known Systems

In the prevailing type of commercially-available hub for attaching an additional wheel to a tractor, there is provided an annular exterior flange, such as the type normally employed to join two sections of pipe together, and it is provided with a number of apertures for receiving studs which project through the flange and the additional wheel to receive nuts which secure the wheel to the flange. The center of the flange is provided with a mounting member adapted to be secured to the axle extension by means of U bolts.

This known type of hub has proved in certain cases to be unsatisfactory because torque is transmitted to the extra wheel through the mounting flange to which the wheel is attached, and the high stresses caused during operation have resulted in fracture of this flange which renders the hub useless.

SUMMARY

In the present invention, the mounting system for an additional wheel for an agricultural tractor or the like is improved by providing a connecting collar for receiving the additional wheel and a mounting block case integrally with the connecting collar together with a pair of side support ribs which extend from the sides of the mounting block outwardly to back and add bulk to the outer periphery of the connecting collar. Preferably, the supporting ribs each extend about the periphery of the connecting collar for about one-fourth of its circumference, thereby adding substantial strength and bulk to the hub and greatly reducing the incidents of fracture. The mounting block is provided with a cylindrical bearing surface for securing to the extension of the tractor axle, and the outer side of the connecting collar has a number of internally threaded holes for receiving doubly-threaded bolts which, in turn, receive the extra wheel of the tractor.

Other features and advantages of the present invention will be apparent to persons skilled in the art from the following detailed description of a preferred embodiment accompanied by the attached drawing wherein identical reference numerals will refer to like parts in the various views.

THE DRAWING

FIG. 1 is a perspective view of a hub incorporating the present invention attached to an axle extension of a tractor;

FIG. 2 is a perspective view of the hub of FIG. 1 showing the ribs and cylindrical bearing surface of the mounting block;

FIG. 3 is a side elevational view of the hub of FIG. 1 taken from the back of the mounting block;

FIGS. 4 and 5 are left and right side views of the hub of FIG. 3; and

FIG. 6 is a side view of the hub of FIG. 3 rotated 90° relative to an axis parallel to the plane of the page.

DETAILED DESCRIPTION

Turning first to FIG. 1, reference numeral 10 generally designates the rear drive wheel of a conventional agricultural tractor having a drive axle which includes an extension 11 adapted to receive a hub generally designated 12. The hub 12 is secured to the axle 11 by means of U bolts 13.

The hub 12 is formed from a single integral steel casting, and it may be thought of as comprising four separate functional parts: a connecting collar 14 (see FIGS. 2, 3 and 6); a mounting block 15, and a pair of side supporting ribs 16 and 17 interconnecting the collar 14 with the mounting block 15 and adding substantial strength and bulk to the connection between those two elements.

The connecting collar 14 has an annular shape, and it is provided with a central aperture or pole 18 which, as can be seen from FIG. 4 is larger in diameter than the extension 11 of the axle (the circumference of the extension 11 being represented in FIG. 4 by the chain line 11a). Extending inwardly (that is, toward the drive wheel 10 of the tractor) of the connecting collar 14 is a mounting block 15 which is provided with a bearing surface 20 having the shape of a cylinder whose axis is colinear with the center of the hole 18. A key 22 (see FIG. 2) extends along the bearing surface 20 in an axial direction for fitting into a way provided on the axle extension 11. The mounting block is also provided with four clearance apertures 23, two of which are spaced to either side of the cylindrical bearing surface 20 for receiving the U bolts 13 in attaching the hub to the axle extension 11.

As best seen in FIGS. 2-4 and 6, the side strengthening ribs 16 and 17 are formed integrally with the sides of the mounting block 15, and they extend outwardly to the periphery of the connecting collar 14 at diametrically opposite locations. The rib 17, for example, is provided with a base 25 serving as a juncture between that rib and the inner surface of the connecting collar 14, and this base conforms to the outer curvature of the connecting collar to add bulk and backing strength to it and to transmit torque received from the mounting block 15 to an extended area about the outer periphery of the collar 14. Similarly, the rib 16 is provided with a base 26 which flares outwardly from the mounting block 15 to the extreme outer edge of the periphery of the inner surface of the connecting block 14, and since it is also a brace and strengthening member for transmitting torque to the outer edge of the connecting collar.

The outer surface of the connecting collar 14 is provided with a rim 30 for centering the additional wheel on the connecting collar. A plurality of threaded bolts 33 extend outwardly from the connecting collar 14 to receive the additional wheel. The bolts 33 may be attached to the connecting collar 14 by first drilling and tapping holes in that collar and then screwing the doubly-threaded bolts 33 into the tapped holes. Of course, as many bolts are provided as are needed for the additional wheel to be attached.

A brace 35 may also be included extending from the inner surface of the connecting collar 14 behind the mounting block 15 and up along the mounting block for adding additional strength and support to the structure.

With the addition of the strengthening ribs 16 and 17 as illustrated and described, the present invention provides for a greatly strengthened removeable mounting hub for an additional wheel to be added on an agricultural tractor, if needed, and it substantially reduces the number of fractures that heretofore occurred in the mounting flange of prior hubs.

Having thus described a preferred embodiment of the invention persons skilled in the art will be able to modify certain portions of the structure illustrated and to substitute equivalent elements for those which have been disclosed; and it is, therefore intended that all such modifications and substitutions be covered as they are embraced within the spirit and scope of the appended claims.

I claim:

1. An improved system for attaching an additional wheel to the axle of a tractor comprising: an integrally cast hub including an annular connecting collar provided with a central hole large enough to receive said axle, a mounting block extending from a first side of said connecting collar and defining a cylindrical bearing surface having an axis colinear with the axis of said hole and adapted to engage said axle, said block further having a keying member extending axially of said bearing surface for fitting into a way provided on said axle and a pair of strengthening ribs connected to said block and to said collar, one of said ribs on each side of said bearing surface of said block, each rib being provided with a base serving as a juncture between that rib and said first side of said connecting collar, each of said bases conforming to the outer curvature of and extending partially about the outer periphery of said connecting collar to add bulk and backing strength to the connection therebetween and to transmit torque from said mounting block to an extended area about the outer periphery of said collar thereby to reduce the liklihood of fracture at the connection between said ribs and said collar; a plurality of threaded studs extending from the second side of said connecting collar for securing said additional wheel thereto; and U bolt means releasably fastened to said mounting block for securing said axle to said mounting block when the same is received in said bearing surface.

2. The combination of claim 1 wherein each of said ribs includes a base integrally formed with the inner surface of said connecting collar and extending there about for at least about one-quarter of the outer circumference of said collar and at diagonally-opposite locations on said collar.

* * * * *